United States Patent
Freitas et al.

Patent Number: 5,966,263
Date of Patent: Oct. 12, 1999

[54] METHOD AND APPARATUS TO INCREASE HEAD/AE SELECT ROBUSTNESS FOR A SYSTEM USING MULTIPLE HEAD SERVO WRITE

[75] Inventors: David A. Freitas, Morgan Hill; Kevin Roy Vannorsdel; Mantle Man-Hon Yu, both of San Jose, all of Calif.

[73] Assignee: International Business Machines Corporation, Armonk, N.Y.

[21] Appl. No.: 08/904,430

[22] Filed: Aug. 1, 1997

[51] Int. Cl.$^6$ ................................. G11B 15/00
[52] U.S. Cl. ................ 360/69; 360/78.12; 360/31; 369/34
[58] Field of Search ................ 360/61, 69, 75, 360/78.04, 121, 31, 55, 78.12, 63; 369/34

[56] References Cited

U.S. PATENT DOCUMENTS

| | | | |
|---|---|---|---|
| 3,453,612 | 7/1969 | Poumakis | 340/174.1 |
| 5,475,544 | 12/1995 | Takeuchi | 360/77.08 |
| 5,479,301 | 12/1995 | Takeuchi | 360/51 |

FOREIGN PATENT DOCUMENTS

| | | | |
|---|---|---|---|
| 2-167396 | 6/1990 | Japan | G11B 5/09 |

*Primary Examiner*—Aristotelis M. Psitos
*Assistant Examiner*—Dan I. Davidson
*Attorney, Agent, or Firm*—Gray Cary Ware Freidenrich

[57] ABSTRACT

The present invention concerns an apparatus, method, and article of manufacture that satisfies the need for verifying the identity of a designated head in a gang servo head environment by querying a control parameter unit. In one embodiment, the invention may be implemented to provide a method to increase head select robustness for group head systems controlled by drive electronics. The method is practiced when a request is made for a designated head to perform a read or write operation. The request is received by a control parameter unit included in an arm electronics unit. The control parameter unit is then queried to verify the identity of the arm electronics unit selected. The identity of the designated head is then received. A parity check of the control data is performed and, assuming no errors, an actuating arm containing the designated head is positioned. The selected arm electronics unit is loaded with read or write data copied from a host system and transferred to or from the storage device. In various embodiments, the actuating arm electronics unit contain circuitry for repeatedly verifying that the proper head was selected and the integrity of data copied to the arm electronics unit.

13 Claims, 6 Drawing Sheets

METHOD AND APPARATUS TO INCREASE HEAD/AE SELECT ROBUSTNESS FOR A SYSTEM USING MULTIPLE HEAD SERVO WRITE

BACKGROUND OF THE INVENTION

1. Field of the Invention

The present invention relates to identifying magnetic heads used in gang or group head environments. More particularly, the invention concerns a method, apparatus, and article of manufacture which allows a head designated from a group of heads, used in a direct access storage device having a storage medium, to be identified during read and write procedures even though the storage medium being read from or written to contains no head number information.

2. Description of the Related Art

"Format Efficiency" refers to the amount of each track in a disk drive devoted to storing user data. The format efficiency may be improved by reducing the overhead. There are a number of contributors to overhead in the format of fixed block architecture disk drives. Some of these, such as synchronization fields, are required for reading the data. Others, such as error correcting codes (ECC) and sector servo, offset their overhead by allowing the areal density to be increased. One contributor to the overhead that does not increase the areal density is the header of an ID field. "ID" is a collective term used to refer to cylinder-number, head-number and record-number fields and information typically stored in the ID field. An alternative to using ID fields is the No-ID sector format which eliminates the ID fields and all the information they contain from the track format, providing a marked improvement in the format efficiency.

Sector Format

Typically, each track on a disk of a DASD is divided into a number of data sectors and servo sectors. The servo fields contain the positioning information used to locate the head over a given track. The user data is stored in the data fields, each with an associated ID field. The ID fields contain information which identifies the data sector and other information, such as flags to indicate defective sections or head number identification.

The majority of disk drives manufactured today use an addressing scheme where the data sectors are identified to the host system by a logical block number (LBN). In operation, the host computer sends a list of logical block numbers to be written or read. The disk drive converts these values into zone, cylinder, head and sector (ZCHS) values. The servo system seeks to the desired zone, cylinder and head, and the disk drive begins reading ID fields until a match is found. Once the appropriate ID field has been read, the drive may then read or write the following data field. The use of ID fields allows great flexibility in the format, and provides a simple mechanism for handling defects. However, there are substantial costs associated with the use of ID fields. The ID fields themselves can occupy up to 10% of a track—space that would otherwise be used to store data. Further, since the disk drive must read the ID field for each sector prior to a read or write operation, additional space is required to allow for write-to-read recovery prior to each ID field. Such write-to-read fields can occupy over 5% of a track.

Furthermore, the use of PRML (partial response, maximum likelihood) digital data detection channels may result in increasing the size of ID fields. PRML channels allow disk drives to operate at higher linear densities. But, PRML digital channels may require replacing the cyclical redundancy checking (CRC) bytes typically used to detect ID field errors with a greater number of ECC bytes capable of correcting errors. To solve these ID field problems, No-ID sector formatting was developed.

No-ID sector format

No-ID sector format uses the servo control system to locate physical sectors, and a defect map stored in RAM to identify logical sectors. This allows the disk data controller to perform a new operation—converting logical block numbers (LBN) to physical block numbers (PBN). The LBN is just a number from 0 to the number of addressable blocks on the disk drive. The PBN is a number from 0 to the number of physical blocks on the disk drive, but with defective and space sectors mapped out. Once the PBN is computed, it may be converted to the exact Zone/Cylinder/Head/Sector (ZCHS) value for the sector. Since the defect information is known in advance, the proper logical block is guaranteed to be located at the computed ZCHS. The defect map is stored in a compressed format and optimized for small size rapid lookup. The servo system is used to locate the physical sector, based upon knowledge of the track formats in each zone. This information includes the locations of any data field splits due to embedded servo, which are also stored in RAM. This method effectively eliminates the need for an ID field on a track.

Gang Servo Writing

Before disk drives used the No-ID architecture, gang servo-writing—writing more than one head at a time—posted no data integrity problems. The ID field containing the head number was written when a file was formatted on a storage disk and later used during normal file operation to check for proper head selection.

In No-ID architecture, the head number information for a non-ganged head is stored on a storage disk when the servo field is written by the head. Later, verification of the head's number can be had by reading back the stored information.

However, in the case of gang servo writing, where multiple heads write to the storage disk at the same time, each head will have the same head number stored on the disk. Currently there is no economical way to write different head numbers to each of these heads. Accordingly, the system controlling the head writing or reading is unable to verify which head was selected because the data contained in the servo field for various heads is identical. This creates a large degree of data integrity exposure.

For the foregoing reasons, there is a great need for an inexpensive method and apparatus that allows the number of a ganged head to be verified without resorting to reading data from a storage disk to verify the head selection.

SUMMARY OF THE INVENTION

Broadly, the present invention concerns an apparatus, method, and article of manufacture that satisfies the need for verifying the identity of a designated magnetic head by reading a control parameter unit rather than relying upon data stored on a storage medium used in a direct access storage device ("DASD").

In one embodiment, the invention may be implemented to provide a method to increase head select robustness for group head systems controlled by drive electronics. The method is practiced when a request is made to the arm electronics for a designated head to perform a read or write operation. The request is received by a control parameter unit included in the arm electronics. The control parameter unit is then read to verify the identity of the arm electronics. Control data is received and decoded in a head address unit so that the proper head is selected. A parity check is performed on the control data by the arm electronics to assure its integrity. A decoder check is performed to verify that the information specifying the head was correctly decoded. If reading of the control parameter unit, or if the parity check or the decoder check indicates that an error has occurred in selecting the proper head, an unsafe operation signal is returned to the servo processor and the read or write operation is terminated. The actuating arm moves the designated head to a position over a selected track of the DASD. The arm electronics are then loaded with read or write data copied from the servo processor unit. Assuming no such error has occurred, data is copied via a data channel to the storage medium of the DASD or read from the storage medium using the designated head and arm electronics.

The invention may also be implemented to provide an apparatus for increasing head select robustness for group head systems controlled by drive electronics. In one version of the apparatus, the invention comprises a disk drive control system for a high density disk drive. In another embodiment, the disk drive has a group of heads mounted on an actuating arm. In other embodiments, the disk drive may have multiple groups of heads mounted on one or more actuating arms, and may incorporate actuating arm electronics on each actuating arm. In any event, the arms are controlled by the drive electronics. Each head reads or writes information recorded on tracks on the disk storage medium surface. The arm electronics include a control parameter unit which is used to identify each magnetic head, and cooperate with the drive electronics to control the movement of each actuating arm and the transfer of data and commands. In various embodiments, the actuating arm electronics contain circuitry for verifying that the proper head was selected and confirming the integrity of data copied to the arm electronics.

In still another embodiment, the invention may be implemented to provide a signal-bearing medium tangibly embodying a program of machine-readable instructions executable by a digital data processing apparatus to perform method steps for increasing head select robustness for group head systems controlled by drive electronics.

The invention affords its users with a number of distinct advantages. One advantage is that the invention provides an inexpensive method, apparatus, and article of manufacture for verifying the identity of a head without relying on head identifying data contained on the storage medium of a storage device. Another advantage is that head identity may be determined with storage mediums formatted with the No-ID architecture discussed above. Furthermore, the invention also offers the advantage of being able to verify the identity of a head without relying on head identifying data and while performing parity checks of all control and head ID data sent from a processor, and decoder checks to verify that the head identification sent from a processor is decoded properly during the head selection process.

The invention also provides numerous other advantages and benefits, each of which should be readily apparent to those skilled in the art especially after studying the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

Figure 1:
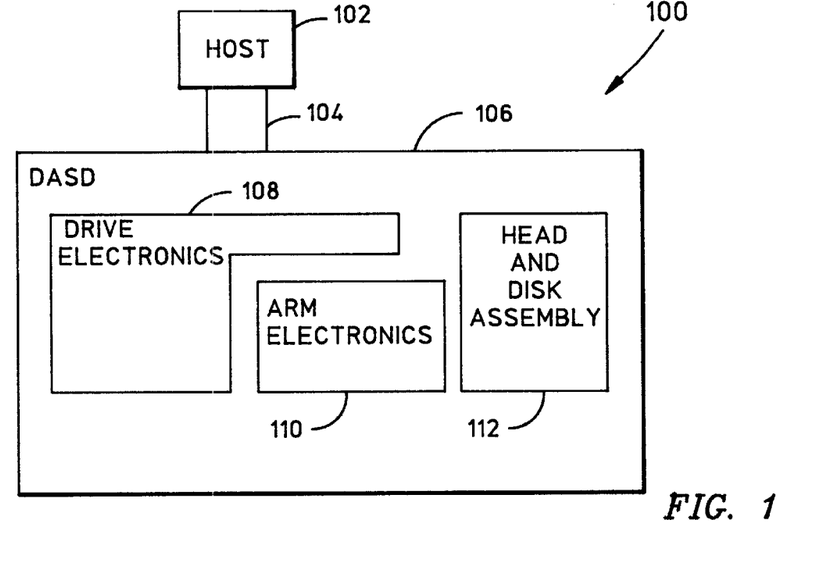
FIG. 1 is a block diagram of a digital data processing machine in accordance with one version of the invention.
Figure 2:
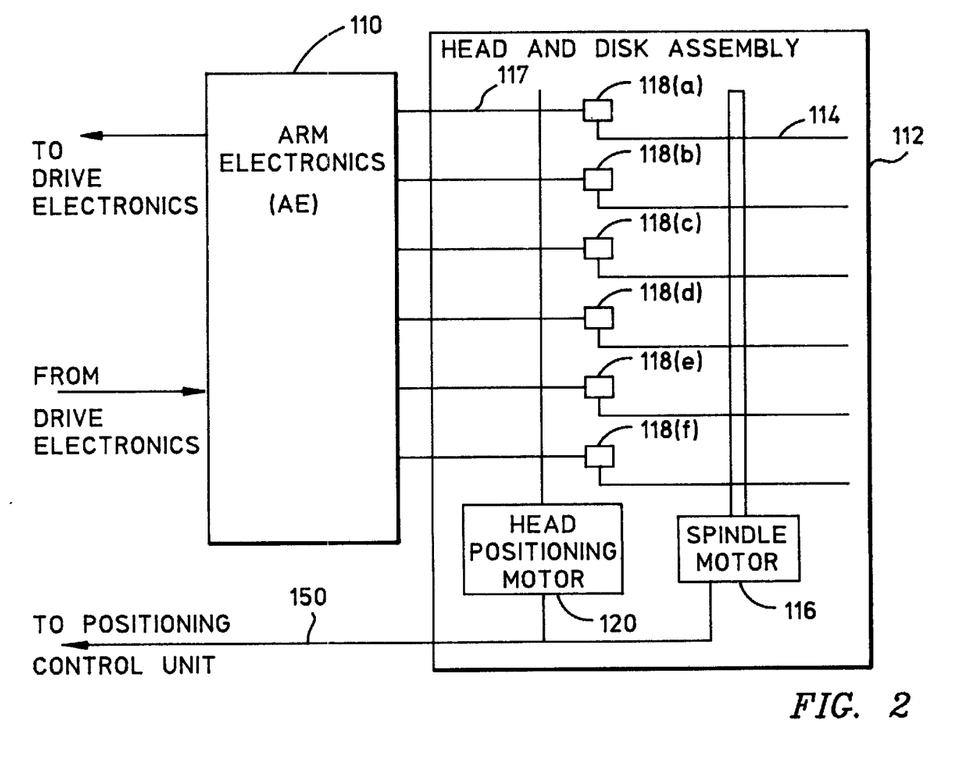
FIG. 2 is a fundamental diagram of the arm electronics and the head and disk assembly of the digital data processing machine of FIG. 1.

One aspect of the invention concerns an apparatus, which may be embodied by various hardware components and interconnections as described by the various embodiments shown in FIGS. 1 through 5. Generally, FIG. 1 illustrates the implementation of a digital data processing system 100 for improving head select robustness in systems using grouped heads. The system 100 includes a host 102 which is typically a computing system such as an S/390, AS/400, or similar type well known to those skilled in the computer arts. The host 102 is coupled to a direct access storage device 106 ("DASD") via input/output channel 104. The channel 104 may perform various functions such as coordinating, receiving, and sending data and commands to and from the host 102, or other typical input/output interface functions well known in the art.

In the preferred embodiment, the DASD 106 comprises drive electronics 108, arm electronics 110 and a head and disk assembly 112. The drive electronics 108 interface and cooperate with the arm electronics 110 to control the physical movements of the DASD components and the transfer of data and commands to and from the head and disk assembly 112. The head and disk assembly 112 is shown in greater detail in FIG. 2. In one embodiment, data and commands are sent via the arm electronics (AE) 110 which in turn communicates with the head and disk assembly 112 including each head 118 (a)–(f). a head positioning motor 120 and a spindle motor 116. Each head is individually attached to an actuating arm 117, and more than one head may be used to read or write to a given disk. In another embodiment, the head positioning motor 120 and the spindle motor 116 may receive information directly from the drive electronics 108. Regardless, the information received by the head and disk assembly is used to move an actuating arm having a designated head to a position over a storage medium 114. The spindle motor 116 may be engaged to rotate the disk to cooperate in locating the head to the proper location.

Figure 3:
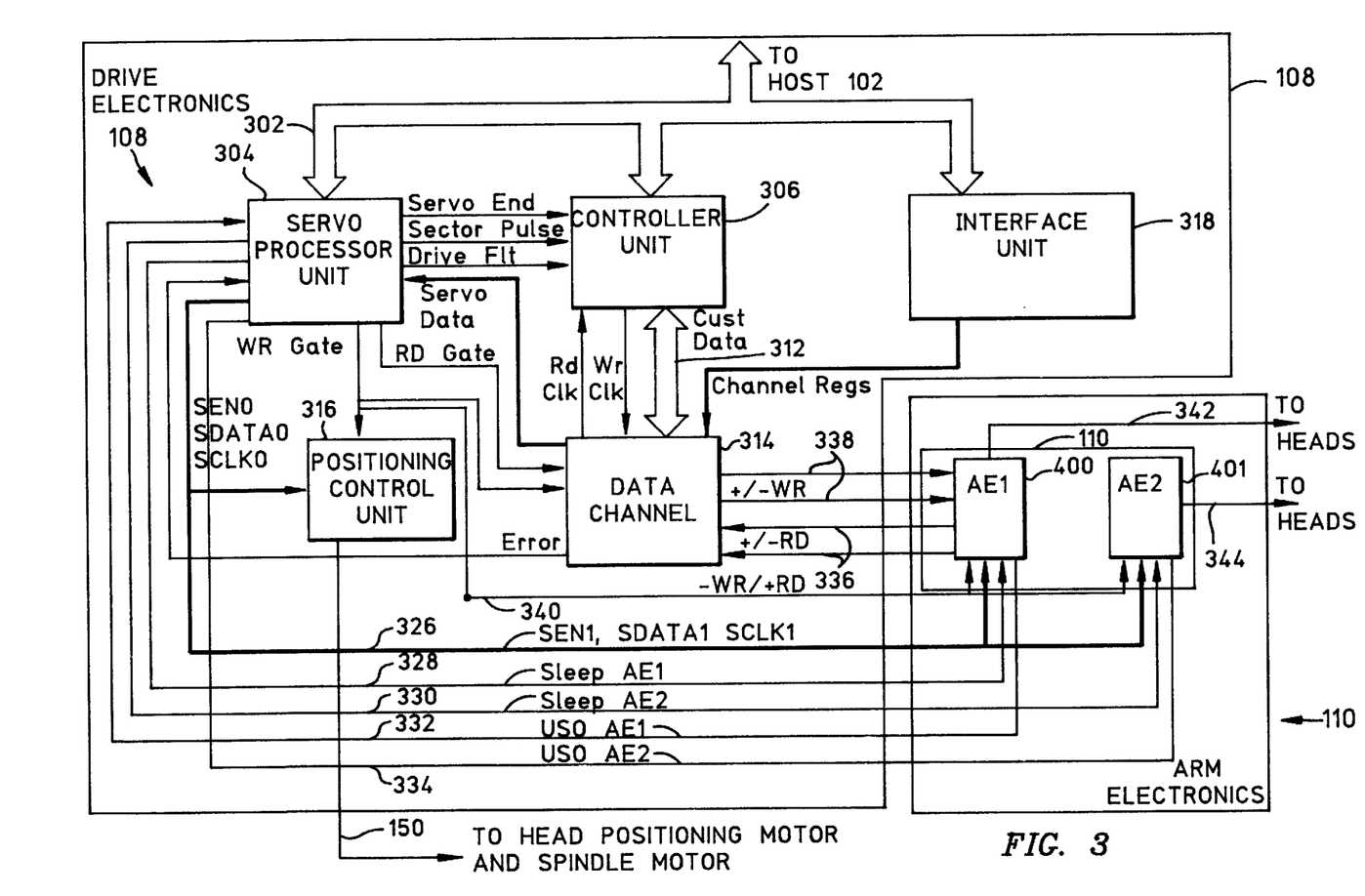
FIG. 3 is a block diagram of the hardware components and interconnections of the drive electronics used in one embodiment of the invention.

FIG. 3 shows the preferred embodiment configuration of the drive electronics 108. The electronics 108 are communicatively connected to the host 102 via bus 302. The bus routes data and commands to the drive electronics 108 including a servo processor unit 304, a controller unit 306, and an interface unit 318. The interface unit 318 may include a processor and a storage unit. In the preferred embodiment, the processor is a standard processor such as the AM-186, and is often called the "IP" or interface processor. The interface unit 318 is the "mother" of the DASD 106 and handles the coordination in high level control tasks of the drive electronics 108. The IP is in communication with each integrated circuit on the drive and handles configuring them appropriately for each requested operation.

In the preferred embodiment, the interface unit 318 may also perform other functions such as off-line error correction coding (ECC) in conjunction with the controller unit 306. Furthermore, if a write data command is received by the controller unit 306, it may be copied from the controller unit 306 to the interface unit 318. The interface unit 318 decides which arm electronics 110, shown as first AE 400 and second AE 401 (described further below), and which head 118 should be used to perform the operation. and which sector to which the data should be written. Thereafter the interface unit 318 copies the information to the servo processor unit 304 via the bus 302.

The controller unit 306 may act as a standard controller and buffer manager in one embodiment. The controller unit 306 may include buffer units and storage units. One function of the controller unit 306 is to arbitrate and control the transfer of data and commands along the bus 302, coordinate ECC which is commonly employed in drive electronics, and to manage the buffer internal thereto. The buffer may act as a cache in the preferred embodiment. The control unit 306 may include a processor, but preferable it does not. The control unit communicates with the interface unit 318 for processor assistance when performing standard controller unit functions such as off-line ECC correction. The controller unit 306 handles all communication to and from any device external to the drive electronics 108, such as communication from or to the host 102.

In the preferred embodiment the servo processor 304 contains circuitry including memory and logic circuits used to implement the No-ID architecture. Essentially, the processor unit 304 controls formatting of the stored data. The servo processor unit 304 may also contain other logic circuitry used to communicate with first AE 400, second AE 401, and the positioning control unit 316. Data code, such as the servo code, may be processed by the servo processor unit 304 and positioning of each of the heads 118 over a given track may also be implemented by the servo processor unit 304.

The servo processor unit 304 communicates with the first AE 400 and the second AE 401. The positioning control unit in the preferred embodiment includes a processor which communicates with and controls the spindle motor 116 and the head positioning motor 120 via line 350. The spindle motor 116 regulates the speed in which the storage disk 114 (shown in FIG. 2) turns, and controls the head positioning motor 120 which E5 is used to move the actuating arm 117 containing a head 118. In another embodiment, the positioning control unit 316 includes additional circuitry to implement miscellaneous control unit functions well known to those skilled in the drive electronics arts. For example, the positioning control unit 316 may implement a power on reset which allows the actuating arm 117 to reset when the head and disk assembly 112 is actuated.

The data channel 314 is communicatively coupled to the positioning control unit 316, the servo processor unit 304, the controller unit 306 and the first AE 400 and second AE 401. The data channel 314 may also interact with the interface unit 318. In the preferred embodiment, the data channel 314 is a partial response, maximum likelihood or "PRML", data channel. For reading data, the data channel 314 reads an analog signal received from the arm electronics 110 and determines the digital data stream of ones and zeros that were originally written to the storage medium 114. During a write operation, the data channel 314 performs the task of write precompensation widely known to those skilled in the art.

The arm electronics 110 may comprise a single arm electronics unit, or multiple arm electronic units. As shown in FIG. 3, the arm electronics 110 comprise the first AE 400 and the second AF 401 in one version of the invention. For clarity, but not by way of limitation, the invention is discussed using the first AE 400 and the second AE 401. The first AL 400 and the second AE 401 may communicate read data and commands to the data channel 314 via read channels 336 and receive write data and commands from the data channel via write channels 338 in the preferred embodiment. Read and write positioning data for positioning the actuating arm 117 may be received by the arm electronics 110 from the positioning control unit 316 on channel 340. The first AE 400 and the second AE 401 receive enable, data and clock information from the servo processor unit 304 via channel 326. The enable, data and clock information performs the functions of loading pertinent operating parameters.

Sleep channels 328 and 330 transmit sleep information from the servo processor unit 304 to the arm electronics. Sleep information allows the servo processor to disable one or both arm electronics. Unsafe operation (USO) channels 322 and 324 carry error signals from the first AE 400 and the second AE 401 to the servo processor unit 304 which enables the processor to determine whether or not an error has occurred that would affect the reading or writing of data to the storage medium, as explained more fully below. USO channels 332 and USO 334 are separate channels and are not connected, as is common in the art.

Figure 4:
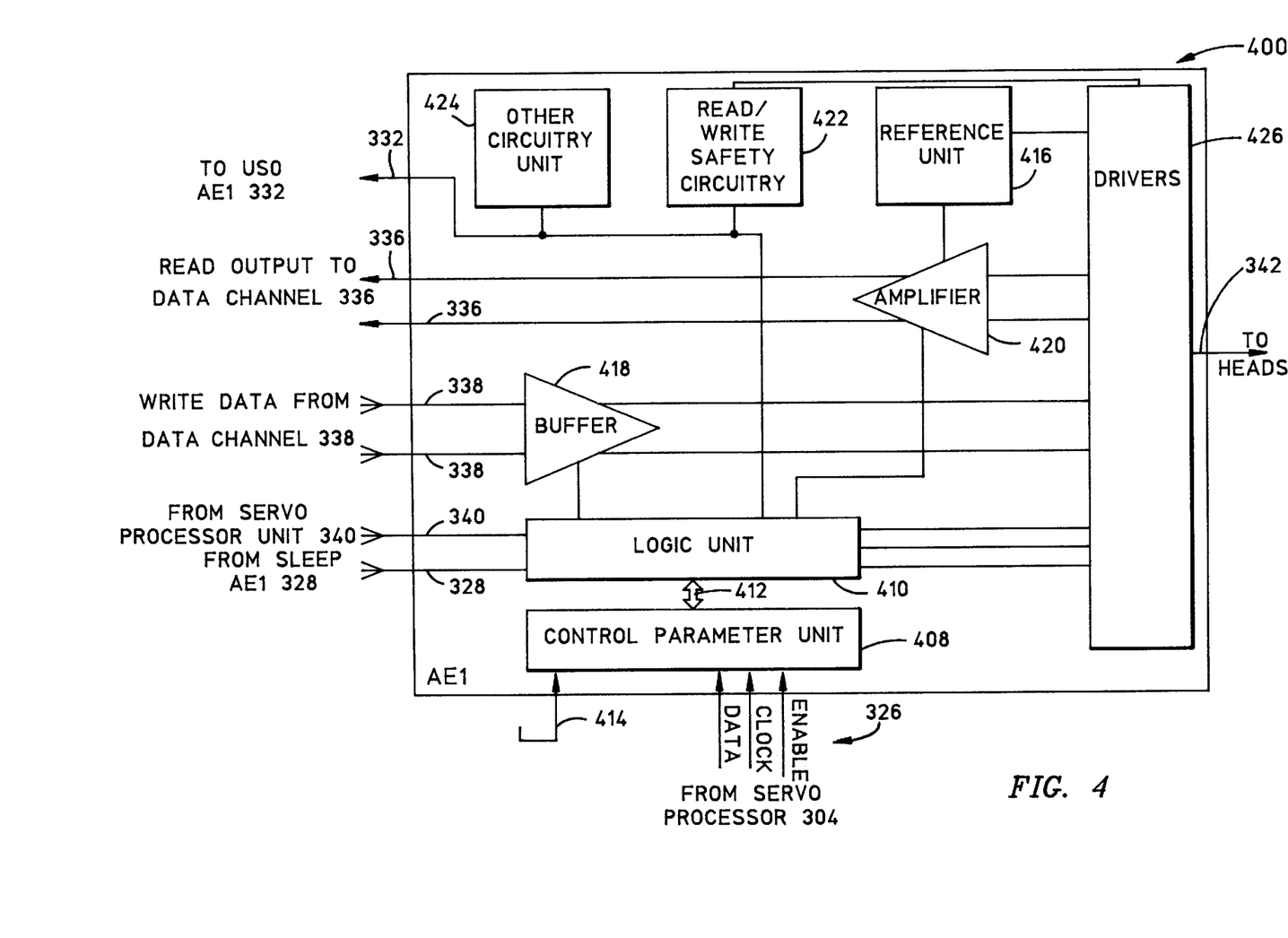
FIG. 4 is a block diagram of the hardware components and interconnections of the arm electronics used in one embodiment of the invention.

A preferred embodiment of the first AE 400 is shown in FIG. 4. Although FIG. 3 shows an embodiment of the invention in which two AEs are implemented, the invention may be also practiced implementing any number of AEs. In the preferred multiple AE version, each AE is structurally similar to each other AE used. The first AE 400 receives from the servo processor 304 an enable signal, a clock signal and data information on channel 326. A control parameter unit 408 uses this information to determine which head is to be enabled for reading or writing data to or from the storage medium 114. Preferably, the control parameter unit comprises two registers capable of receiving parallel input. The control parameter unit also receives information identifying an arm electronics unit via channel 414. In other words, the control parameter unit receives information identifying the first AE 400 as either a logical "0" (zero) or "1" (one). Once the control parameter unit reads this identification of the first AE 400 and determines the head selection information, the control parameter unit may be read by the servo processor unit 304 via channel 326 to verify that the proper head and arm electronics have been selected. For example, if a "1" is used to identify the AE 400, then the servo processor unit 304 reads back this information after it has been loaded into the control parameter unit 408. The "read-back" of the information is a first check to assure the proper arm electronics unit has been selected. The servo processor then tells the selected arm electronics unit which head to use to perform an operation, and also performs a parity check of the information (also called "control data").

This control information is transferred to the logic unit 410 via bus 412. The logic unit also receives actuating arm and head positioning information via channel 340 and sleep information via channel 328. The logic unit 410 may receive various other information via the buffer 418. For example, write data from data channel 338 is received in the buffer 418 prior to its storage on the storage medium 114. The logic unit 410 assists in implementing writing of the write data to the storage medium. Similarly, the logic unit 410 is coupled to an amplifier 420 which is used in amplifying data read from the storage medium 114 and transferred to the drive electronics 108 via the read output channel 336. Other circuitry unit 424 and read/wkTite safety circuitry 422 cooperate and are coupled to the drivers 426 and the logic unit 410 to generate an error signal if an unsafe operation has been attempted or performed. For example, a USO message might be sent to the drive electronics 108 via USO channel 332 if a damaged head is detected.

Other circuitry unit 424 may include in the preferred embodiment, a defective power supply indicator and various special-test or self-test units used to verify that designated hardware is working correctly or that selected functions are being satisfactorily performed.

The read and write safety circuitry 422 performs the function of detecting error conditions that may cause data loss or head/AE damage. The safety circuitry 422 may include, for example, an open head detector or a write transition detector.

The drivers 426 cooperate with each element of the first AE 400 in transferring data read from the storage medium 114 and writing data to the storage medium 114. The drivers perform such functions as controlling the interface between the head and disk assembly 112 and the first AE 400 in one embodiment, and in other embodiments may include other functions well known to those schooled in the driver arts. The reference unit 416 performs the function of providing reference voltages and currents, and may comprise a bandgap reference and a current source coupled to the driver 426 and the amplifier 420.

Although various embodiments, including the preferred embodiment, of the first AE 400 have been discussed above, other variations of the arm electronics will be apparent to those schooled in the art. For example, the arm electronics would function even if the other circuitry unit 424 was not implemented as an element. Likewise, the amplifier 420 and the buffer 418 may be eliminated and the first AE 400 remains functional. However, in the preferred embodiment, each of the elements shown in FIG. 4 is included in the first AE 400 and, as articulated above, in the second arm electronics 401.

Figure 5:
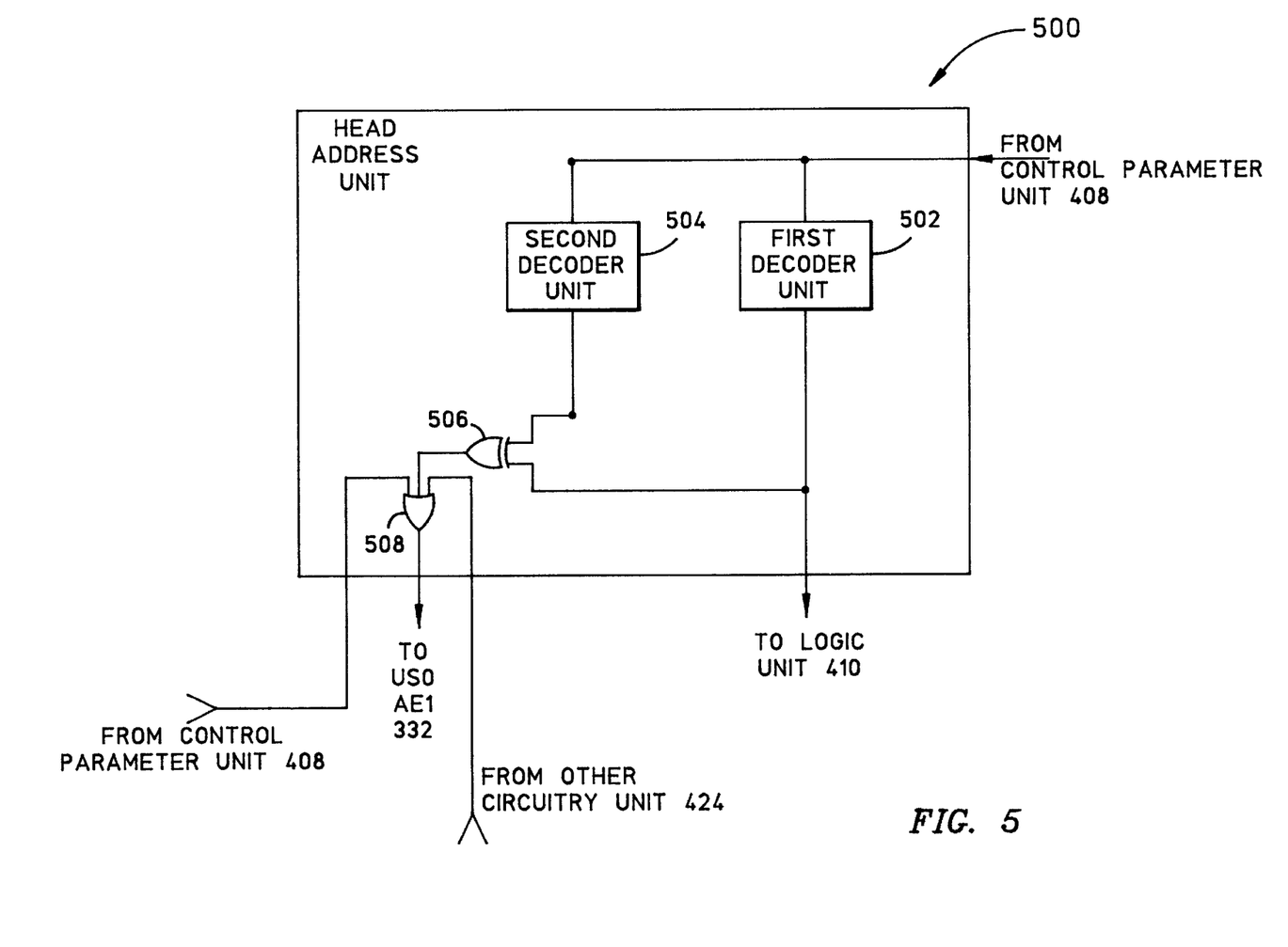
FIG. 5 is a block diagram of the hardware components and interconnections of the head address unit used in one embodiment of the invention.

The control parameter unit 408 shown in FIG. 4 may also include a head address unit 500. A preferred embodiment for the head address unit 500 is shown in FIG. 5. The head address unit 500 comprises in the preferred embodiment a first and a second decoder unit 502 and 504. The decoder units in the preferred embodiment may be 4/16 decoders which are well known in the art and perform the function of decoding the information received from the control parameter unit 408. The decoded information is used to implement the head selected. Preferably, the first decoder unit 502 performs the decoding function whereas the second decoder unit 504 is used in parallel to verify that the first decoder unit 502 is functioning properly. A logic gate 506, preferably an exclusive "or" gate, receives a signal from the second decoder unit 504 and the first decoder unit 502. A signal is then transferred from logic gate 506 to a second logic gate 508. Preferably, the logic gate is an "or" gate which receives the data from the logic gate 506, the control parameter unit 408, and the other circuitry unit 424. Based upon the signals, if an error has occurred a signal is generated by second logic gate 508 and sent to the drive electronics 108 via USO channel 332. For example, an error may occur because damage to a head address decoder unit has occurred.

OPERATION

In addition to the various hardware embodiments described above, a different aspect of the invention concerns a method for increasing head select robustness for group head system controlled by drive electronics.

Signal-Bearing Media

Such a method may be implemented, for example, by operating the digital data processing system 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to increase head select robustness in group head systems.

Figure 6:
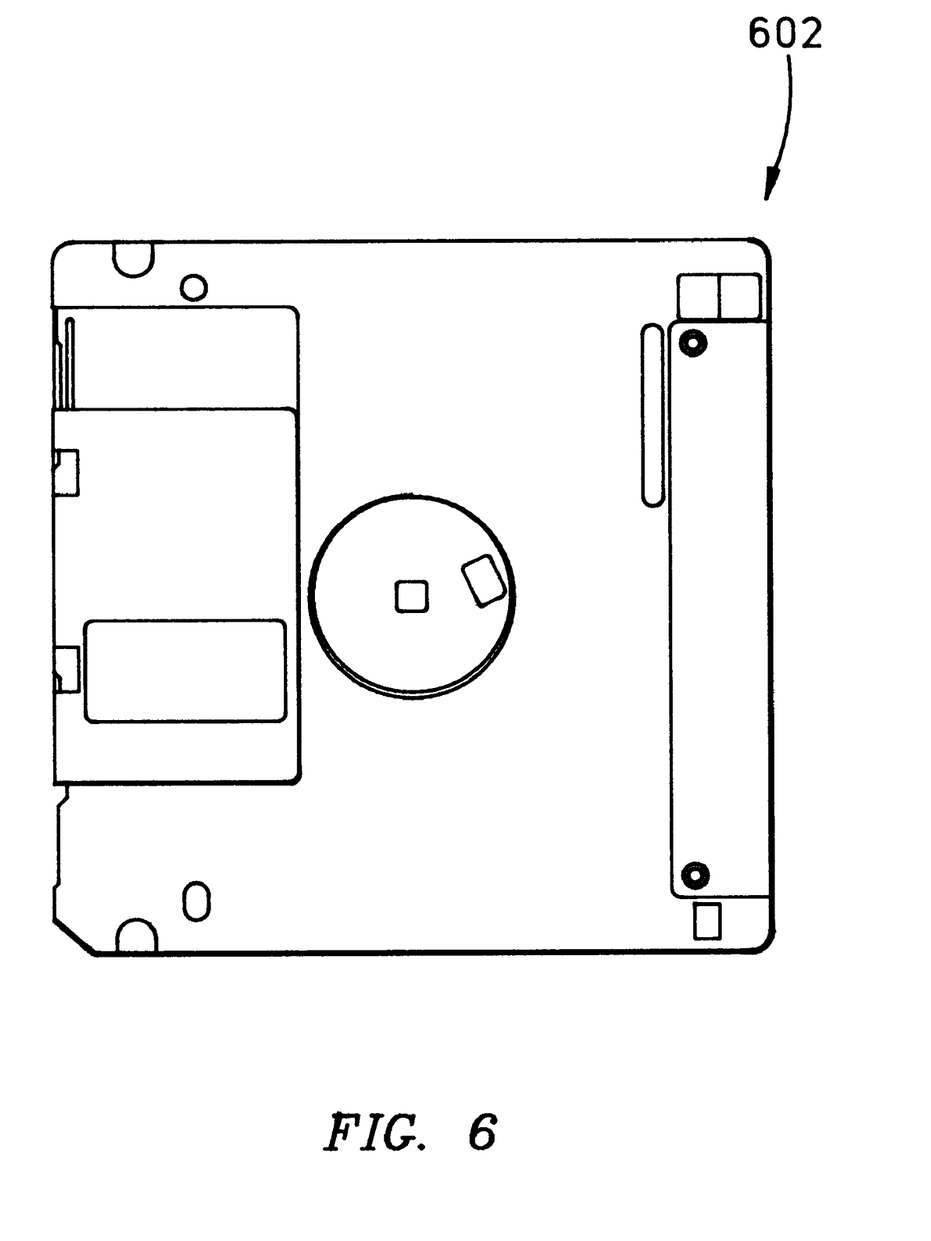
FIG. 6 is a perspective view of an exemplary signal-bearing medium in accordance with the invention.

This signal-bearing media may comprise, for example, RAM (not shown) contained within the host 102. Alternatively, the instructions may be contained in another signal-bearing media, such as a magnetic data storage diskette 602 (FIG. 6), directly or indirectly accessible by the host 102. Whether contained in the host 102 or elsewhere, the instructions may be stored on a variety of machine-readable data storage media, such as DASD storage (e.g., a conventional "hard drive" or a RAID array), magnetic tape, electronic read-only memory (e.g., CD-ROM or WORM), an optical storage device (e.g., WORM), paper "punch" cards, or other suitable signal-bearing media including transmission media such as digital and analog and communication links and wireless. In an illustrative embodiment of the invention, the machine-readable instructions may comprise lines of assembly code or lines of a compiled high level language code.

Overall Sequence of Operation

Figure 7:
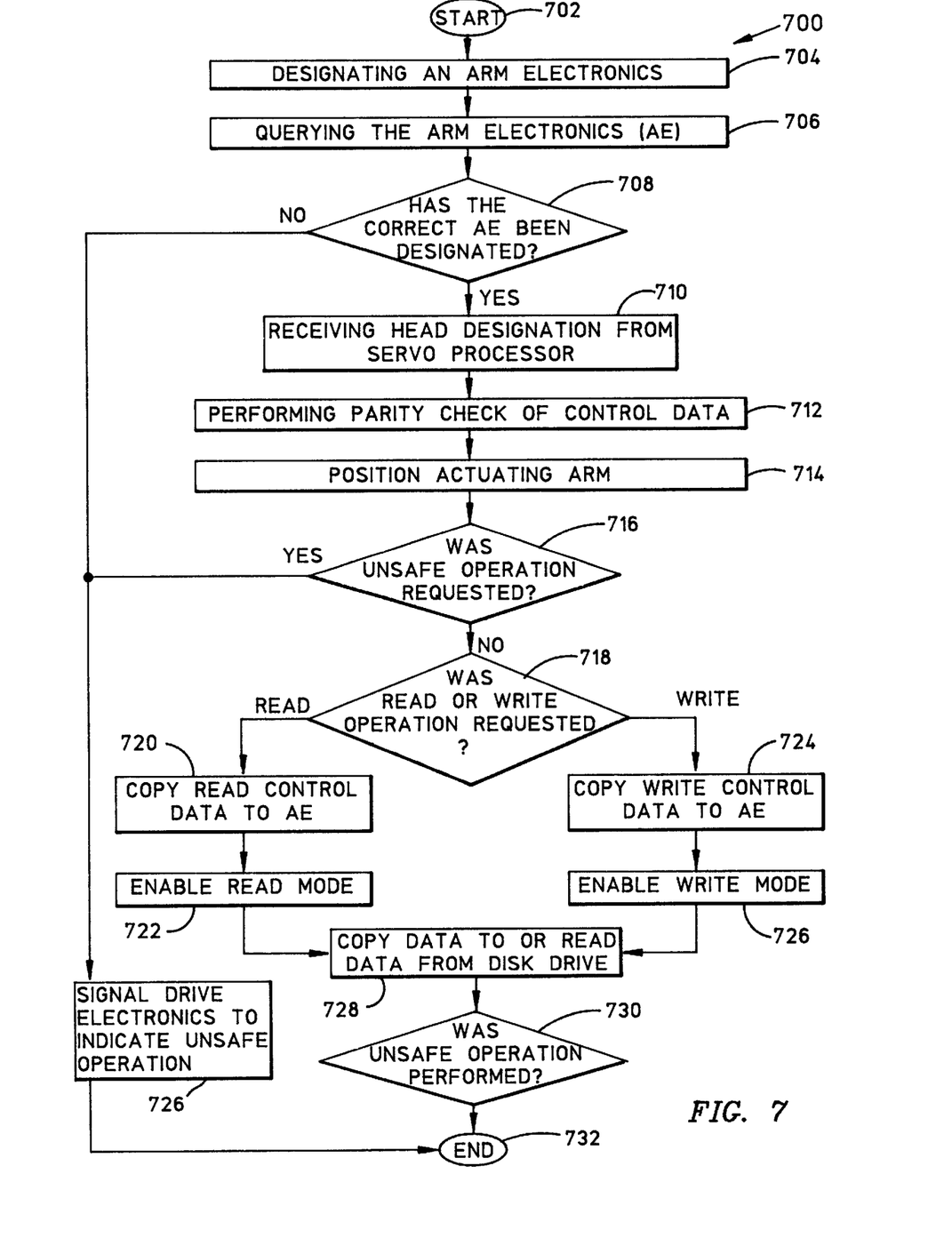
FIG. 7 is a flow chart of an operational sequence in accordance with one embodiment of the invention.

FIG. 7 shows a sequence of method steps 700 to illustrate one example of the method aspect of the present invention. For ease of explanation, but without any limitation intended thereby, the example of FIG. 7 is described in the context of the system 100 described above. The steps are initiated in task 702, when a read or write request is made. In step 704, an arm electronics is identified by a logical bit "1" or a "0" as the arm electronics unit that will be performing the read and write operation. A first AE 400 or a second AE 401, depending upon which communicates with a desired head 418, is queried in step 706 in order to verify that the correct arm electronic was selected. The identification data contained in the control parameter unit 408 is read through channel 326 by the servo processor unit 304 shown in FIG. 3. In other words, the identity of the arm electronic is determined by reading back the arm electronic identification "1" or "0". By knowing the arm electronic identification bit transferred to the control parameter unit 408 via channel 326, the servo processor 304 of the drive electronics 108 can verify in step 708 that the proper arm electronics in communication with a desired head has been designated for the read or write operation. If the proper arm electronics has not been selected, the drive electronics is signaled that an unsafe operation has occurred.

For purposes of discussion and not by way of limitation, AE1 400 will be used as an example in the following discussion. Accordingly, the AE1 400 receives control information in step 710 from the servo processor unit 304 designating a head to be used in performing the read or write operation. The designated head may be one of a group of heads associated with AE1 400. For purposes of this discussion, the designated head will be referred to as head 118 and may comprise a servo head or a magnetic head. The head 118 is designated by the servo processor unit 304 of the drive electronics 108 after the host 102 has made a read or write request.

A parity check is performed in step 712 to check the integrity of the control data used to designate the arm electronic and head. Parity checks are well known to those schooled in the art for verifying the integrity of copied data. In this embodiment, parity checking is used because it is a much faster method of confirming data integrity than has been used on this interface previously. Once the parity check has been performed, an actuating arm 117 is positioned in step 714 by the head positioning motor 120 over the area where data will be read from or written to the disk.

If the parity check indicates that an unsafe operation ("USO") was performed in step 712, a USO error signal is returned to the drive electronics 108 in task 716. If a USO was not performed, then the control data is copied to AE1 400 in step 718. If a read operation was requested in step 718, read control data is copied to the AE1 400 in step 720. Read control data is commonly known and used to coordinate the transfer of data from a storage device. The read control data enables the read mode of the arm electronics in step 722 and data is read from the data storage medium 114 in step 728. If a USO is performed during the copying of the read data from the storage medium 114 in step 728, then a USO error signal is returned to the drive electronics 108 in step 730. In step 732 the read method ends.

If a read operation was not requested, then in step 718 it is determined if a write operation was requested. If no write operation was requested by system 100, then a USO signal (not shown) is returned to the drive electronics 108. If a write operation was requested, write control data is copied to the AE1 400 in step 724. Write control data is commonly known and used to coordinate the transfer of data to a storage device. The write control data enables the write mode of the arm electronics in step 726 and data is Written to the data storage medium 114 in step 728. If a USO is performed during the copying of the data to the storage medium 114 in step 728, then a USO error signal is returned to the drive electronics 108 in step 730. In step 732 the Write method ends.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method to increase head select robustness for group head systems controlled by drive electronics, comprising:

copying arm electronics unit identification data to an arm electronics unit including a head to be used in a read or write operation, the head being one of a group of heads coupled to the arm electronics unit;

querying the arm electronics unit to verify the identity of the arm electronics unit;

copying read or write control data to the arm electronics unit;

positioning an actuating arm to which the head is attached to locate the head over a selected location on a storage unit; and writing data to or reading data from the storage unit using the head.

2. The method recited in claim 1, the arm electronics unit identification data consisting of one bit of data.

3. The method recited in claim 2, wherein the group of heads comprises multiple groups.

4. The method recited in claim 1, wherein the arm electronics unit includes a control parameter unit for providing information identifying the arm electronics unit and the head.

5. The method recited in claim 4, the step of querying including:

verifying the information identifying the arm electronics unit and the head; and reporting any fault indicated by the information to the drive electronics.

6. A signal-bearing medium tangibly embodying a program of machine-readable instructions executable by a digital processing apparatus to perform a method for increasing head select robustness for group head systems controlled by drive electronics, said method comprising:

copying arm electronics unit identification data to an arm electronics unit including a head to be used in a write or read operation, the head being one of a group of heads communicatively coupled to the arm electronics unit;

querying the arm electronics unit to verify the identity of the arm electronics unit;

copying read or write control data to the arm electronics unit;

positioning an actuating arm to which the head is attached to locate the head over a selected location on a storage unit; and writing data to or reading data from the storage unit using the head.

7. The signal-bearing medium recited in claim 6, the arm electronics unit identification data consisting of one bit of data.

8. The signal bearing medium recited in claim 7, wherein the grouped heads comprise multiple groups.

9. The signal-bearing medium recited in claim 6, wherein the arm electronics unit includes a control parameter unit for providing information identifying the arm electronics unit and the head.

10. The signal bearing medium recited in claim 7, the step of querying including:

verifying the information identifying the arm electronics unit and the head; and reporting any fault indicated by the information to the drive electronics.

11. A disk drive servo control system for a high density disk drive having multiple heads mounted on arms and controlled by drive electronics, each head reading information recorded on tracks on a disk storage medium surface, the servo control system comprising:

two or more arm electronics units, each arm electronics unit connected to control position and operation of a plurality of said heads;

a control parameter unit connected to the drive electronics for providing information identifying an arm electronics unit and a head to perform a read or write operation; and means in the drive electronics, connected to the control parameter unit and to the two arm electronics units, for verifying the information and for designating one of the two arm electronics units and a head to perform the read or write operation based upon verification of the information.

12. A high density disk drive head control system, comprising:

a disk storage medium having a recording surface;

multiple actuating arms;

a head mounted on each actuating arm and held above the recording surface;

a mechanism for positioning the heads over the recording surface to read data recorded on the disk storage medium or transfer data to the disk storage medium;

drive electronics coordinating the mechanism and transfer of data to and from the disk storage medium;

two or more arm electronics units, each arm electronics unit connected to control position and operation of a plurality of said heads;

a control parameter unit connected to the drive electronics for providing information identifying an arm electronics unit and a head to perform a read or write operation; and means in the drive electronics, connected to the control parameter unit and to the two arm electronics units, for verifying the information and for designating one of the two arm electronics units and a head to perform the read or write operation based upon verification of the information.

13. The disk drive head control system of claim 12 wherein, the recording surface does not contain any head number identification information.

* * * * *